(12) United States Patent
Sherwood et al.

(10) Patent No.: US 9,725,335 B2
(45) Date of Patent: Aug. 8, 2017

(54) REMOVAL OF COPPER FROM AQUEOUS STREAMS USING AN IRON PROMOTED ACTIVATED ALUMINA

(71) Applicant: THE FRAZER AND CRUICKSHANK LIVING TRUST DATED 3/24/1982, Christiansted (VG)

(72) Inventors: Nancy S. Sherwood, Wellsville, OH (US); Duane R. Steelman, Streetsboro, OH (US)

(73) Assignee: THE FRAZER AND CRUICKSHANK LIVING TRUST DATED 3/24/1982, Christiansted (VG)

( * ) Notice: Subject to any disclaimer, the term of this patent is extended or adjusted under 35 U.S.C. 154(b) by 0 days.

(21) Appl. No.: 14/203,726

(22) Filed: Mar. 11, 2014

(65) Prior Publication Data
US 2014/0263068 A1    Sep. 18, 2014

Related U.S. Application Data

(60) Provisional application No. 61/777,172, filed on Mar. 12, 2013.

(51) Int. Cl.
*C02F 1/28*     (2006.01)
*C02F 101/20*   (2006.01)

(52) U.S. Cl.
CPC ............. *C02F 1/281* (2013.01); *C02F 1/288* (2013.01); *C02F 2101/20* (2013.01)

(58) Field of Classification Search
None
See application file for complete search history.

(56) References Cited

U.S. PATENT DOCUMENTS

| 2,976,322 | A | * | 3/1961 | Kempf | C07C 321/00 568/71 |
| 3,853,789 | A | * | 12/1974 | Warthen | B01J 21/04 423/600 |
| 4,187,282 | A | * | 2/1980 | Matsuda | B01D 53/02 252/190 |
| 5,997,829 | A | * | 12/1999 | Sekine et al. | 423/210 |
| 6,599,429 | B1 | | 7/2003 | Azizian | |
| 7,160,465 | B2 | * | 1/2007 | Kirts | B01D 21/0003 210/170.03 |
| 7,326,346 | B2 | | 2/2008 | Lovell et al. | |

FOREIGN PATENT DOCUMENTS

WO    WO-2011005742 A1    1/2011

OTHER PUBLICATIONS

Barakat, M.A., "New trends in removing heavy metals from industrial wastewater," Arabian Journal of Chemistry, vol. 4, pp. 361-377 (No month listed 2011).

International Search Report and Written Opinion Issued by the U.S. Patent and Trademark Office as International Searching Authority for International Application No. PCT/US14/23207 mailed Jun. 6, 2014 (7 pgs.).

No author listed, "Taking on Storm Water: NESDI Program Addressing Immediate Needs, Testing Solutions & Gathering Knowledge," Currents: The Navy's Energy and Environmental Magazine, 6 pages (Fall 2011).

* cited by examiner

*Primary Examiner* — Chester Barry
(74) *Attorney, Agent, or Firm* — Wilmer Cutler Pickering Hale and Dorr LLP

(57) ABSTRACT

Techniques for reduction of copper from aqueous streams using an iron promoted activated alumina are disclosed. An adsorbent media composition that reduces copper levels in an aqueous feed stream includes an iron containing activated alumina. A process for reducing copper levels in an aqueous fluid using an iron promoted activated alumina sorption media includes contacting the aqueous fluid containing a copper contaminant with the iron promoted activated alumina to achieve reductions in copper from the aqueous fluid.

10 Claims, No Drawings

REMOVAL OF COPPER FROM AQUEOUS STREAMS USING AN IRON PROMOTED ACTIVATED ALUMINA

CROSS-REFERENCE TO RELATED APPLICATION

This application claims priority under 35 U.S.C. §119(e) to U.S. Provisional Patent Application Ser. No. 61/777,172, filed Mar. 12, 2013, entitled Removal of Copper From Aqueous Streams Using an Iron Promoted Activated Alumina, the entire contents of which are incorporated by reference herein.

FIELD OF THE INVENTION

The present invention relates to use of iron promoted activated alumina as an adsorbent material for the removal of copper from aqueous streams.

BACKGROUND OF THE INVENTION

Copper exists as a contaminant in water streams. Copper in water can be derived from rock weathering and the treatment of algae with copper salts but the principal source of copper in water is from the corrosion of copper and brass piping and fittings. When copper and copper based alloys are present and in contact with water, system upsets such as pH excursions, oxidizing biocides, ammonia, cyanides, hydrogen sulfide and process leaks will dissolve copper.

The human health hazards of copper upon ingestion include gastrointestinal distress with short term exposure and liver or kidney damage upon long term exposure. The US EPA and regulatory agencies in other countries have limited copper levels in both drinking and industrial waters. The US EPA has set the maximum contaminant level goal for copper at 1.3 mg/L or 1.3 ppm for drinking water. Individual US states may set more stringent regulations for copper in drinking water. Industrial and municipal discharge limits on copper are set to protect aquatic wildlife and fish.

Copper can be removed from water by ion exchange, reverse osmosis membranes, electrodialysis and activated carbon filtration and adsorption. Sorption media are known contaminant removal agents. Activated carbons and functionalized aluminas are examples of effective sorption media used in industrial wastewater treatment. The mechanism of removal of metals and other contaminants by sorption media is by bonding of the contaminant to the adsorbent surface as water containing the contaminant comes in contact with the adsorbent. The chemistry of the sorption media drives its ability to remove specific contaminants.

SUMMARY OF THE INVENTION

Embodiments of the invention include an adsorbent media composition that removes copper from water by contacting the water in a feed stream with a solid sorption media compound comprising an iron containing activated alumina thereby forming a treated stream comprising less copper than the feed stream.

Embodiments of the invention also include a composition and process for removing copper from an aqueous fluid using an iron promoted activated alumina sorption media. The composition is a sorption media containing from 0.1 to 20% iron oxide in a processed blend with aluminum oxide to form a solid iron promoted activated alumina.

Further embodiments of the invention include a process that involves contacting an aqueous fluid containing ppm to ppb levels of copper contaminant with an iron promoted activated alumina to achieve very high reductions in copper from the aqueous stream.

Unless otherwise specifically stated, the percentages and parts-per notations are weight percentages and weight fractions, respectively.

DETAILED DESCRIPTION

The feed stream treatable by embodiments of the current invention can be any aqueous stream containing copper from a source such as, but not limited to, storm water runoff, groundwater remediation sites, mining operations, a petroleum refinery, municipal wastewater, utility wastewater and flue gas desulfurization water, a chemical plant, oil production, metal treatments, washing operations, and food and beverage manufacture. Commercial sources of fluid streams, such as a vehicle wash station runoff, are also treatable by the techniques disclosed herein. Further still, natural sources of water, and naturally occurring bodies of water are also eligible feed streams.

The feed stream typically comprises water and a copper compound. The copper compound is typically in a soluble or dissolved state consisting of compounds of either the cuprous, metallic or cupric valence states. The water may contain copper compounds such as, but not limited to, copper nitrate, copper chloride, metallic copper, copper sulfate, copper selenate, cuprous chloride, and copper fluoride. The feed stream typically comprises, but is not limited to copper at concentrations of 10 ppm to 1 ppt as copper on an elemental basis. Most typical is copper at 2 ppm to 10 ppb. The feed stream can also comprise, consist of, or consist essentially of water and can contain other metal contaminants, dissolved salt ions such as, but not limited to, sulfate, chloride, calcium, magnesium, carbonate, silica, and organic contaminants.

In implementations of the present invention, the adsorbent media is selected from the group consisting of aluminum oxide, activated alumina, iron oxide and iron hydroxide and combinations thereof. Most preferably, the adsorbent media is activated alumina blended with iron oxide and formed into granular particles. The blending of activated alumina and iron oxide occurs in the powdered form with water and heat to provide granular particles of up to, but not limited to 5000 microns in diameter to 7 microns. Further, the aluminum oxide/activated alumina granule is highly porous and crush resistant When blended with iron oxide, the resulting iron promoted alumina should have but is not limited to, a macroporosity (>750 A) of 0.05 to 0.15 cc/gram and a crush strength of >30 lbs. The iron content comprises 0.1 to 20%, more typically, 2 to 15% as iron oxide.

The aqueous feed stream is contacted with a sufficient quantity of the adsorbent media composition for a sufficient contact time such that the treated stream exhibits a reduction in copper content of 10 to 100%, typically 70 to 100%. The feed stream to adsorbent contact time can be as low as 1 second to a high of 30 days, more typically, 5 to 125 minutes empty bed contact time or 20 to 60 minutes hydraulic retention time. Contact times between 30 days and 10 years are also possible. The contact between the media and aqueous stream can be achieved by, but is not limited to, flow-through continuous or batch vessels, fill-hold-drain tank applications or in porous containments that allow water to seep into and out of the sorbent media. For example, a water permeable bag containing the iron promoted activated alumina composition can be used to contact copper-containing fluid. Further still, a foam material containing, or impregnated with, the iron promoted activated alumina composition can be used to contact the copper-containing fluid.

The temperature at which the feed stream is contacted with the sorbent composition is in the range of 0° C. to 80° C., preferably from about 10° C. to 40° C.

Without being limited to any particular theory, it is believed that in the sorption media, the aluminum oxide and iron oxide sites attract the copper and the copper becomes bound by covalent and ionic bonding to the media. The result is the formation of copper oxide complexes on the surface and throughout the pores of the sorbent. The copper does not desorb from the media and the media capacity is not quickly exhausted. This results in a sorption media with a high and sustained ability to continuously remove targeted copper contaminants

EXAMPLES

The following examples illustrate the effectiveness of the inventive process for removing copper from an aqueous stream.

Example 1

A water consisting of a tap water base from the Solon, Ohio, municipal authority containing copper at varying levels of 255 ppb to 302 ppb of dissolved copper, to which selenium (as sodium selenite) and mercury (as mercuric nitrate) were added in the laboratory, was used as the feed stream with the sorption media composition to test copper removal. The water quality for this example is detailed in the following Table:

TABLE 1

Feed Stream Water Quality

| Water Constituent | Typical Concentration |
| --- | --- |
| Copper | 255 to 302 ppb |
| Calcium | 34 ppm |
| Magnesium | 9.2 ppm |
| Sulfate | 147 ppm |
| Chloride | 19.2 ppm |
| Nitrate | 0.69 ppm |
| Orthophosphate | 1.46 ppm |
| Fluoride | 1.6 ppm |
| Barium | 17.3 ppb |
| Boron | 186 ppb |
| Iron | 41.2 ppb |
| Manganese | 14.4 ppb |
| Silica | 0.68 ppm |
| Strontium | 148 ppb |
| Selenium | 375 ppb |
| Mercury | 487 ppb |
| pH | 7.03 |
| Alkalinity, $CaCO_3$ | 452 ppm |

In to a 250 ml capped polypropylene bottle, 175 mL of the feed stream water was added to 155 grams of iron promoted aluminum, Dynocel CS MAR, obtained from Porocel Industries. Many different commercial production lots of Dynocel CS MAR were used for testing with all containing a nominal 8% iron as iron oxide in activated alumina. Tests are numbered below using a selection from the lots. After addition of feed stream water and the sorption media, the bottle was capped and mixed slowly to ensure that the media was wetted by the water. At an ambient temperature of 72° F., the feed stream water and sorption media composition were left in contact without stirring for 30 minutes. After 30 minutes, the water was withdrawn from the sorption media with a syringe and filtered immediately through a 0.45 μ syringe filter into nitric acid preserved bottles for copper analysis. The filtration step separated any fine particles of sorption media from the water to ensure that no further removal continued beyond the 30 minute contact time. Copper for the feed stream and the 30 minute sorption media treated water was measured by ICP using EPA method 200.7. The results of the tests are shown in Table 2.

TABLE 2

| Different Iron Promoted Activated Aluminas Containing 7-9% Iron Oxide | Copper Content of Feed Stream Water, ppb | Copper Content of Sorbent Treated Water after 30 Minutes | % Removed |
| --- | --- | --- | --- |
| 1 | 255 | 2.6 | 98.9 |
| 2 | 302 | 4.0 | 98.7 |
| 3 | 302 | 2.4 | 99.2 |
| 4 | 302 | 10.1 | 96.7 |
| 5 | 302 | 3.3 | 98.9 |
| 6 | 255 | 2.1 | 99.2 |
| 7 | 302 | 6.9 | 97.7 |
| 8 | 302 | 3.0 | 99.0 |
| 9 | 302 | 2.3 | 99.2 |

As can be seen from the data in Table 2, the use of an iron promoted activated alumina sorption media composition in contact with water in a 30 minute fill-hold-drain batch treatment application is very effective in removing copper from the water.

Example 2

A packed bed, flow-through column of 8% iron promoted activated alumina using the iron promoted activated alumina sorption media, identified as 9 in Example 1, was prepared in a 1" diameter×36" long glass column. A feed stream of Solon municipal tap water containing varying levels of copper was pumped up-flow through the column at a water flow rate of 19.0 mL/minute. This flow rate provided an empty bed contact time of 25.1 minutes. The empty bed volume of the column was 460.9 cm³. 42 liters (equivalent to 91.1 bed volumes) of water were treated. Results of the flow-through column test are shown in Table 3.

TABLE 3

| Bed Volumes of Feed Stream Water Flow | Copper Content of Untreated Inlet Feed Stream, ppb | Copper Content of Iron Promoted Activated Alumina Sorbent Treated Water Exiting Column, ppb | % Removed |
| --- | --- | --- | --- |
| 4.3 | 441 | 18.5 | 95.8% |
| 8.7 | 441 | 17.3 | 96.1% |
| 13.0 | 441 | 12.5 | 97.2% |
| 17.4 | 441 | 11.2 | 97.5% |
| 34.7 | 339 | 13.2 | 96.1% |
| 52.1 | 126 | 8.5 | 93.3% |
| 69.4 | 339 | 13.9 | 95.9% |
| 86.8 | 474 | 14.8 | 96.9% |
| 91.1 | 317 | 13.9 | 95.6% |

Thus, in flow-through column applications, the copper is removed by the iron promoted activated alumina sorption media composition to low ppb copper levels. In both the batch and flow through applications, copper removal always exceeded 90%. Further, the flow-through column test demonstrated sustained removal of the copper by the sorption media composition through varied feed stream levels of copper for many bed volumes treated and is an indication of high capacity of the composition.

Example 3

The results shown in Example 1, Table 2, were achieved using various iron promoted activated alumina sorbents that each contained a nominal charge of 8% iron oxide that was added to the composition during the formation of the iron promoted aluminum oxide sorbent pellets and granules. When iron promoted activated aluminas containing other charges of iron oxide were tested in the copper removal test described in Example 1, removal of copper was found for all iron oxide levels. The results of the tests are shown in Table 4.

TABLE 4

| Iron Promoted Activated Alumina Sample | Nominal Iron Oxide Content | Copper Content of Feed Stream Water, µg/L | Copper Content of Sorbent Treated Water after 30 minutes, µg/L | % Removed |
|---|---|---|---|---|
| A | 5% | 158 | Not detected, <10 | >95% |
| B | 8% | 255 | 2.6 | 98.9% |
| C | 10% | 315 | Not detected, <10 | >95% |
| D | 14% | 158 | Not detected, <10 | >95% |

It should now be apparent that various embodiments of the present invention accomplish the object of this invention. Iron promoted activated alumina compositions can act as an adsorbent media for the removal of copper in aqueous streams.

It should be appreciated that the present invention is not limited to the specific embodiments described above, but includes variations, modifications and equivalent embodiments.

What is claimed:

1. A method of reducing an amount of copper species present in an aqueous stream comprising contacting the aqueous stream with an iron promoted activated alumina sorption media, wherein the iron promoted activated alumina sorption media comprises granular particles comprising a blend of activated alumina with iron oxide, wherein the iron promoted activated alumina sorption media has a macroporosity (>750 A) of 0.05 to 0.15 cc/gram.

2. The method of claim 1, wherein the copper species is dissolved in the aqueous stream at ppm to ppb levels.

3. The method of claim 1, wherein the contacting the aqueous stream with the sorption media includes as least one of (i) flowing the aqueous stream through a bed comprising the sorption media, (ii) soaking the aqueous stream into the sorption media, and (iii) performing a fill-hold-drain batch treatment on the aqueous stream with the sorption media.

4. The method of claim 1, wherein the aqueous stream is in contact with the sorption media composition for a time from about 1 second to about 30 days.

5. The method of claim 4, wherein the aqueous stream is in contact with the sorption media composition for a time from about 1 minute to about 60 minutes.

6. The method of claim 1, wherein the aqueous stream is at least one of an industrial, municipal, oilfield, sea water, and ground water source, wherein the aqueous stream comprises varied amounts of total dissolved solids and copper.

7. The method of claim 1, wherein the copper species includes at least one of copper nitrate, copper chloride, metallic copper, copper sulfate, copper selenate, cuprous chloride, and copper fluoride.

8. The method of claim 1, wherein the sorption media includes between about 0.1% and about 20% by weight of iron oxide.

9. The method of claim 8, wherein the sorption media includes between about 99.9% and about 80% by weight of aluminum oxide.

10. The method of claim 1, wherein the contacting the aqueous stream with the sorption media is achieved by a flow-through continuous process.

* * * * *